United States Patent
Hang et al.

(10) Patent No.: US 9,261,147 B1
(45) Date of Patent: Feb. 16, 2016

(54) INSTALLATION ERROR PROOF CLUTCH RELEASE BEARING AND METHOD OF INSTALLATION IN CLUTCH FORK

(71) Applicant: Perfection Hy Test Company, Charleston, SC (US)

(72) Inventors: Quang Toan Hang, Mount Pleasant, SC (US); Gary M. Croyle, Hartsville, SC (US); Arnaldo Bassaco, Mount Pleasant, SC (US)

(73) Assignee: Perfection Hy Test Company, Charleston, SC (US)

( * ) Notice: Subject to any disclaimer, the term of this patent is extended or adjusted under 35 U.S.C. 154(b) by 44 days.

(21) Appl. No.: 14/475,124

(22) Filed: Sep. 2, 2014

Related U.S. Application Data

(60) Provisional application No. 62/010,010, filed on Jun. 10, 2014.

(51) Int. Cl.
*F16D 23/14* (2006.01)

(52) U.S. Cl.
CPC .............. *F16D 23/14* (2013.01); *F16D 23/148* (2013.01); *F16C 2361/43* (2013.01); *F16D 2023/141* (2013.01)

(58) Field of Classification Search
CPC .......................... F16D 23/141; F16D 2023/141
USPC .......................................................... 192/98
See application file for complete search history.

(56) References Cited

U.S. PATENT DOCUMENTS

| | | | |
|---|---|---|---|
| 2,275,387 A | 3/1942 | Wemp | |
| 3,250,357 A | 5/1966 | Zeidler | |
| 4,122,929 A | 10/1978 | Maucher et al. | |
| 4,219,246 A | 8/1980 | Ladin | |
| 4,276,974 A | 7/1981 | Ladin | |
| 4,534,458 A * | 8/1985 | Ladin | F16D 23/14 192/110 B |
| 4,611,700 A | 9/1986 | Després | |
| 4,660,702 A | 4/1987 | Flotow | |
| 4,733,763 A * | 3/1988 | Gay | F16D 23/146 192/110 B |
| 4,739,867 A * | 4/1988 | Harrington | F16C 23/08 192/110 B |
| 4,883,155 A | 11/1989 | Gay et al. | |
| RE33,127 E | 12/1989 | Wimbush | |

(Continued)

FOREIGN PATENT DOCUMENTS

GB 927811 6/1963

OTHER PUBLICATIONS

Schaeffler Automotive Aftermarket USA, Clutch Installation Tips, http://www.schaeffler-aftermarket.us/content.schaeffler_as.us/us/services_luk_as/technicalinfo/installationtips/clutch_installation_tips.jsp, accessed Jun. 2014, 1 page.

(Continued)

*Primary Examiner* — Richard Lorence
(74) *Attorney, Agent, or Firm* — Andrus Intellectual Property Law, LLP

(57) ABSTRACT

A clutch release bearing designed for error proof installation on a holding structure of a clutch fork in a clutch system includes a bearing assembly supported on a bearing carrier, and an inner flange extending radially outwardly from the bearing carrier. The clutch release bearing also includes an outer flange spaced from the inner flange, and secured to the bearing carrier. The outer flange is formed with a circular lip defining an installation safeguard to ensure reception and retention of the holding structure of the clutch fork only between the inner and outer flanges.

22 Claims, 6 Drawing Sheets

(56) References Cited

U.S. PATENT DOCUMENTS

| | | | |
|---|---|---|---|
| 4,903,808 | A | 2/1990 | Okubo et al. |
| 5,727,666 | A | 3/1998 | Maucher |
| 6,811,013 | B2 | 11/2004 | Dittmer et al. |
| 7,712,595 | B2 | 5/2010 | McCutcheon et al. |
| 8,381,890 | B2 | 2/2013 | Raber |
| 2011/0067225 | A1 | 3/2011 | Bassaco |

OTHER PUBLICATIONS

The Novak Guide to Clutches, Linkages & Bellhousings for Jeep® Conversions, http://www.novak-adapt.com/knowledge/clutches_etc.htm, accessed Jun. 2014, 21 pages.

Underhood Service, Tech Tip: GM Release Bearing Installation Notes, Feb. 19, 2013, http://www.underhoodservice.com/Controls/PrinterFriendly/PrinterFriendly.aspx, accessed Jun. 2014, 3 pages.

\* cited by examiner

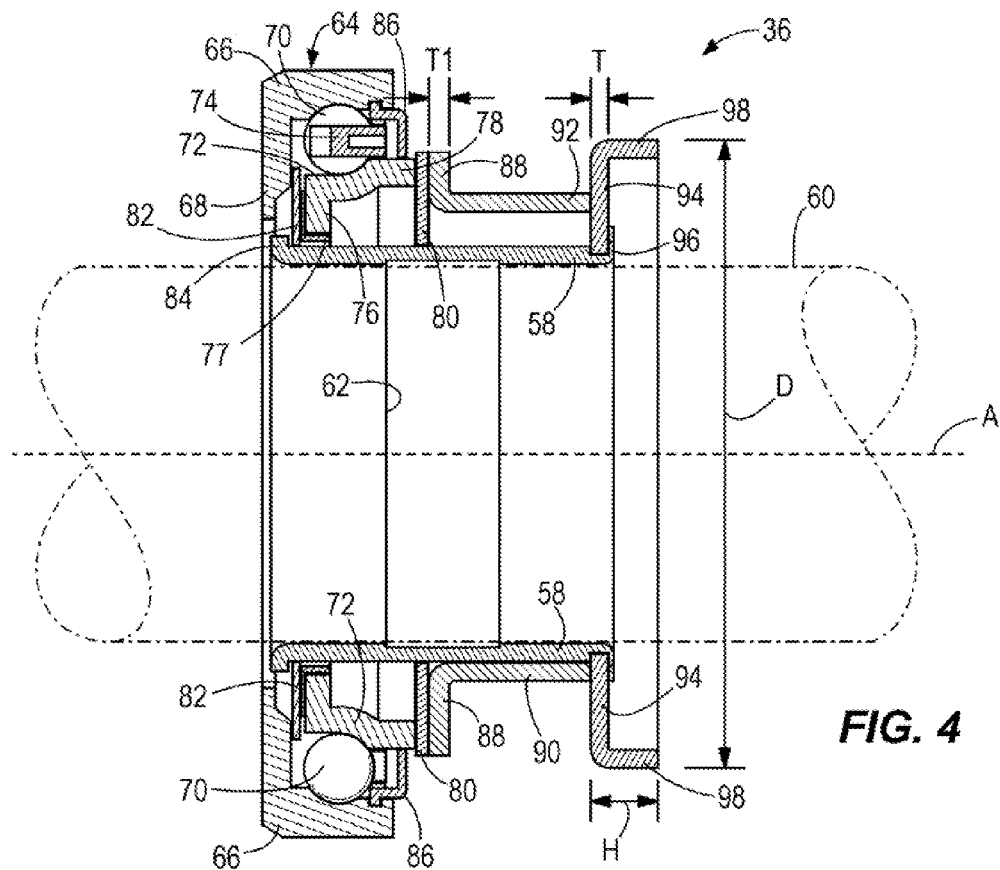
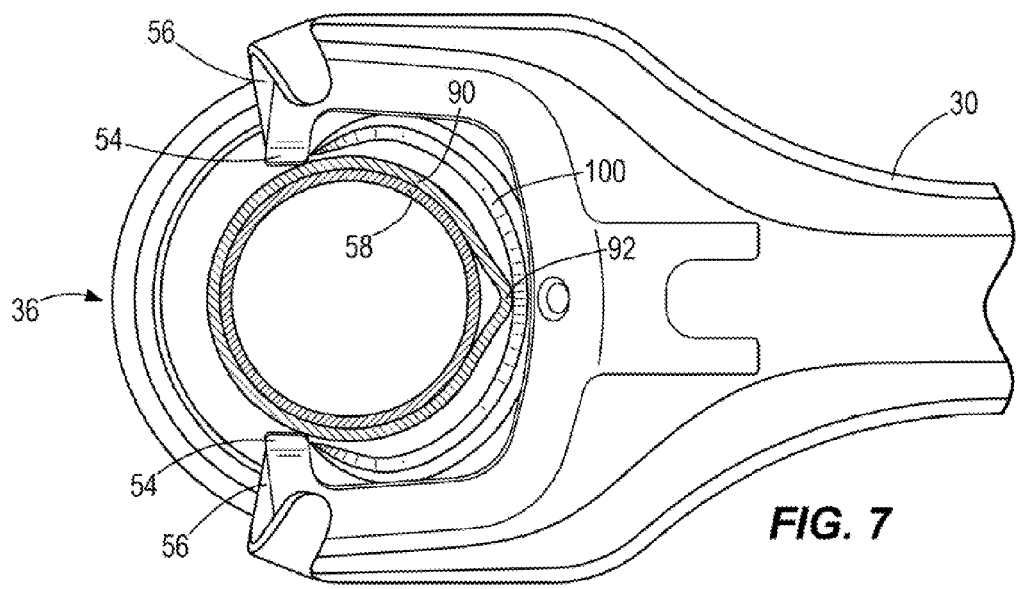

INSTALLATION ERROR PROOF CLUTCH RELEASE BEARING AND METHOD OF INSTALLATION IN CLUTCH FORK

CROSS-REFERENCE TO RELATED APPLICATION

The present utility application relates to and claims priority to U.S. Provisional Patent Application No. 62/010,010 filed Jun. 10, 2014, which is incorporated herein in entirety.

FIELD

The present disclosure relates generally to rotatable clutch systems and assemblies, such as used in automobiles and similar motor vehicles. More particularly, the present disclosure pertains to the structure and installation of a release bearing as commonly employed in a rotatable clutch system and assembly.

BACKGROUND

A typical motor vehicle clutch system and assembly includes a spring biased clutch pedal, a hydraulic release system or mechanical release system and a pivotally mounted bifurcated clutch fork provided with fork clips and spring clips engaged with a clutch release (throwout) bearing. The release bearing is selectably movable along a guide member, which can for example include a support tube and/or a quill, through which a rotatable transmission input shaft of a vehicle transmission extends. The input shaft projects through and is drivingly engaged with a rotatable flywheel and a clutch unit formed from a rotatable clutch disk and a rotatable pressure plate held in a clutch cover.

When a clutch system is engaged, the clutch disk is clamped against the flywheel and transfers power from the engine crankshaft to the transmission input shaft so as to create movement of the wheels when the motor vehicle is in a particular gear setting.

When it is desired to change gears in a manual transmission, the clutch pedal is depressed to actuate the master cylinder forcing fluid therefrom and into the slave cylinder which, in turn, causes movement of a slave cylinder rod against one end of the clutch fork of opposite to an end engaged with the release bearing. The clutch fork pivots and slides the release bearing along the guide member and into engagement with the diaphragm springs or release fingers of the pressure plate. Such engagement between the release bearing and the pressure plate removes pressure from the clutch disk allowing release to occur between the clutch disk and the friction surface of the flywheel. At this point, no power is transferred to the transmission and gear changes can be made. When the clutch system is reengaged, such as after a shift, the force from the diaphragm spring supplies enough force to reverse the disengagement process and raise the clutch pedal off the floor.

Through research and experimentation, the inventors of the present disclosure have discovered that original clutch equipment, such as the clutch release bearing, is extremely sensitive to installation errors. Known release bearings often include a generally circular collar with spaced apart flat outer and inner flanges extending radially outwardly from the outer surface of the collar. It has been found that these flat flanges allow an end user to incorrectly install a replacement release bearing which causes the clutch system to operate improperly, such as failure to shift, premature wear, excessive pedal effort and system failure.

Proper installation of the clutch bearing in a pocket of the clutch fork is established when both the spring clips and the fork clips are positioned between the outer and inner flanges of the release bearing collar and urged around the collar such that the spring clips frictionally engage the outer flange and the fork clips frictionally engage the inner flange. Improper installation of the release bearing on the fork occurs when the outer flange of the release bearing lies between the fork clips and the spring clips. If the clutch release bearing is not installed properly, the clutch system will not release correctly resulting in premature failure of the release bearing and damage to other parts of the vehicle drive system.

Accordingly, the present inventors have determined that it is desirable to provide a clutch release bearing which prevents placement of the outer flange into an open gap between the spring clips and the fork clips of the clutch fork. The inventors have also found that it is desirable to provide a clutch release bearing configured to permit entry and frictional engagement of the spring clips and the fork clips only between the outer and inner flanges of the clutch bearing, thus ensuring error proof installation of the release bearing in the clutch system.

SUMMARY

The present disclosure relates generally to a clutch release bearing adapted to be installed on holding structure of a clutch fork in a clutch system. The clutch release bearing includes a bearing carrier adapted to be supported on a guide member of the clutch system. A bearing assembly is supported in surrounding relationship on the bearing carrier. An inner flange extends radially outwardly from the bearing carrier. An outer flange is spaced from the inner flange, and is secured to and extends radially outwardly of the bearing carrier. The outer flange includes an outer edge bent axially rearwardly beyond a rearward edge of the bearing carrier to form a circular lip defining an installation safeguard configured and adapted to ensure reception and retention of the holding structure of the clutch fork only between the inner flange and the outer flange.

The inner flange and the outer flange have a circular configuration. An outer diameter of the circular lip is greater than an outer diameter of the inner flange. In one exemplary embodiment an outer diameter of the circular lip is 57 millimeters, and a height of the circular lip is 6 millimeters. The bearing assembly can include a plurality of balls interposed between a rotatable outer race and a stationary inner race fixed to a stabilization washer extending radially from the bearing carrier. The inner flange is fixed to the stabilization washer. A collar is attached to the bearing carrier and extends between the inner flange and the outer flange.

The present disclosure further relates to a clutch release bearing installed on holding structure of a clutch fork in a clutch system. The clutch release bearing includes a bearing carrier and a bearing assembly supported in surrounding relationship on the bearing carrier. An inner flange extends radially outwardly from the bearing carrier. An outer flange is spaced from the inner flange and is secured to and extends radially outwardly of the bearing carrier. The outer flange includes an outer edge bent axially rearwardly beyond the rearward edge of the bearing carrier to form a circular lip defining an installation safeguard configured to ensure reception and retention of the holding structure of the clutch fork only between the inner flange and the outer flange.

The present disclosure further contemplates a method of providing error free installation of a clutch release bearing relative to holding structure of a clutch fork in a clutch system. The method can include a) providing the clutch release bearing in the form of a bearing assembly supported in surrounding relationship to a bearing carrier, an inner flange extending radially outwardly from the bearing carrier, and an outer flange spaced from the inner flange and secured to and extending radially outwardly of the bearing carrier, the outer flange including an outer edge bent axially rearwardly beyond a rearward edge of the bearing carrier to form a circular lip; b) aligning the clutch release bearing with a pocket and the holding structure of the clutch fork; and c) urging the clutch release bearing into the pocket of the clutch fork, the circular lip being sized and shaped to permit reception and retention of the holding structure only between the outer flange and the inner flange.

The holding structure of the clutch fork includes a set of spring clips and a set of fork clips spaced from the spring clips. Retention of the holding structure includes frictional engagement of the spring clips with the outer flange beneath the circular lip, and frictional engagement of the fork clips with inner flange beneath the circular lip. A collar is attached to the bearing carrier and extends between the inner flange and the outer flange.

BRIEF DESCRIPTION OF THE DRAWINGS

FIG. 4 is a sectional view of the clutch release bearing shown in FIG. 3.

FIG. 7 is a plan view of the finished proper installation of the clutch release bearing on the clutch fork showing a partial cross-section of the clutch release bearing.

DETAILED DESCRIPTION OF THE DRAWINGS

In the present disclosure, certain terms have been used for brevity, clarity, and understanding. No unnecessary limitations are to be inferred therefrom beyond the requirement of the prior art because such terms are used for descriptive purposes and are intended to be broadly construed. The different systems, apparatuses and method steps described herein may be used alone or in combination with other systems, apparatuses and method steps. It is to be expected that various equivalents, alternatives and modifications are possible within the scope of the appended claims. Each limitation in the appended claims is intended to invoke interpretation under 35 U.S.C. §112(f), only if the terms "means for" or "step for" are explicitly recited in the respective limitation.

Figure 1:
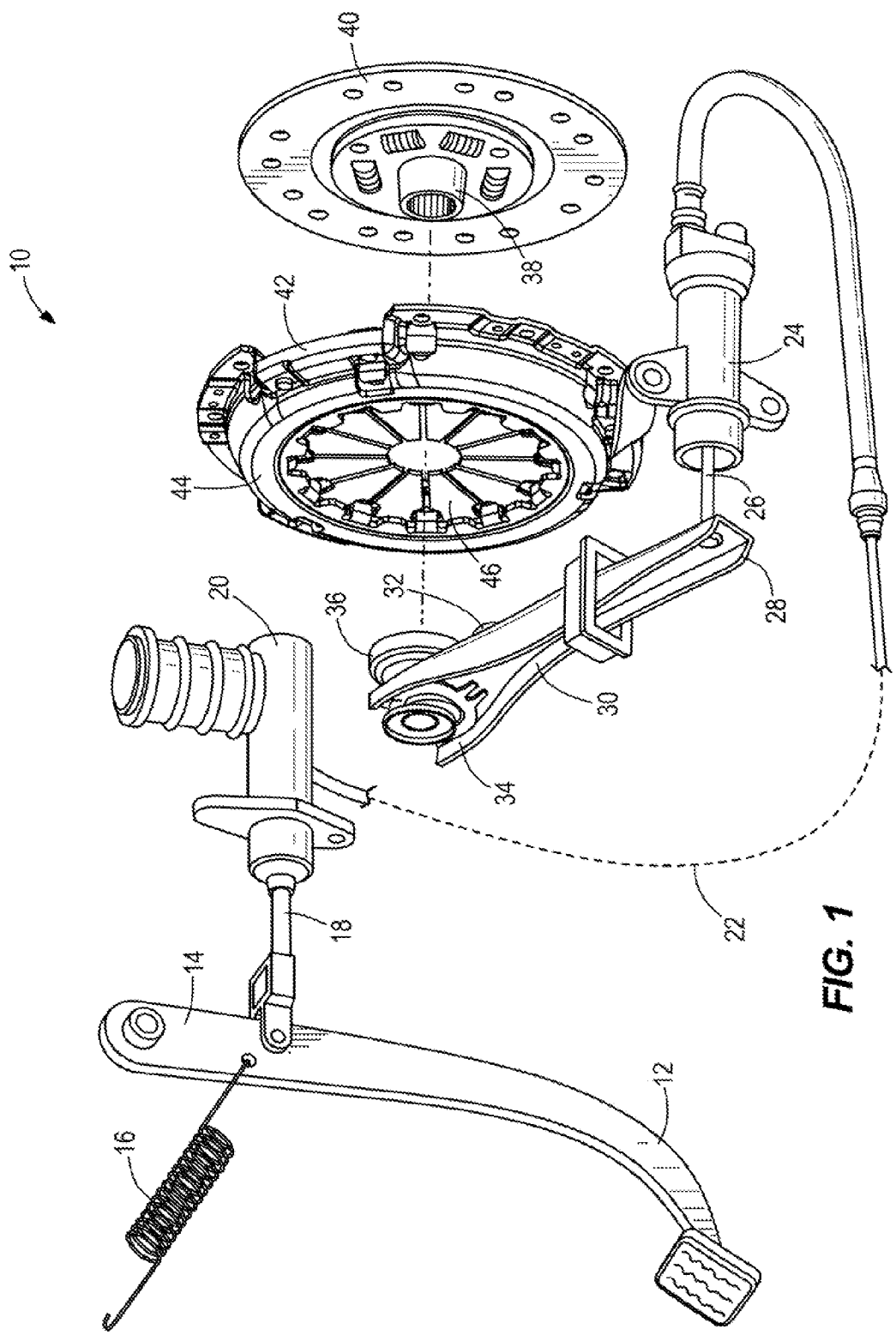
FIG. 1 is an exploded perspective view of a clutch system embodying a clutch release bearing in accordance with the present disclosure.

Referring now to the drawings, FIG. 1 illustrates a typical combination hydraulic and mechanical clutch system 10 of the type used on automobiles, trucks and similar motor vehicles. The clutch system 10 includes a clutch pedal 12 having an upper end 14 which is pivotally mounted beneath the dash of a motor vehicle. The upper end 14 of the clutch pedal is attached to one end of a spring 16 which is also secured beneath the vehicle dash, and is used to normally urge the clutch pedal 12 in an upward position relative to the vehicle floor. The upper end 11 of the clutch pedal 12 is further secured to an extendable and retractable rod 18 of a master cylinder 20 which is usually attached to a firewall of the vehicle, and which is in communication with a hydraulic fluid reservoir. The master cylinder 20 is connected by clutch piping or a hydraulic fluid line 22 to a slave cylinder 24.

The slave cylinder 24 receives a hydraulic fluid transfer from the master cylinder 20, and has an extendable and retractable rod 26 which is connected to a lower end 28 of a clutch release lever or fork 30. The fork 30 is positioned for pivotal movement within a mounting device 32, and has a bifurcated upper end 31 provided with holding structure which is engaged with a clutch release bearing 36. The clutch release bearing 36 is movably mounted during clutch engagement by means of a fork 30 along a guide member through which a rotatable transmission input shaft of the vehicle transmission extends. The transmission input shaft passes through and is configured for driving engagement with a flywheel, a splined hub 38 of a clutch disk 40, and a pressure plate 42 held within a clutch cover 44. The pressure plate 42 has a series of centrally located stiff springs or release fingers 46 which are engaged by the release bearing 36 during clutch disengagement.

With the clutch system 10 engaged, the flywheel, the clutch disk 40 and the pressure plate 42 are in frictional holding engagement with each other and in rotary driving engagement with the transmission input shaft so that rotary movement of the engine can be transferred to the wheels of the vehicle.

When it is desired to disengage the clutch system 10, the pedal 12 is depressed causing movement of the hydraulic fluid to flow from the master cylinder 20 to the slave cylinder 24. Actuation of the slave cylinder 24 will pivot the fork 30 and move the release bearing 36 axially along the support tube into engagement with the springs or fingers 46 of the pressure plate 42. This causes the pressure plate 42 to relax its hold on the clutch disk 40, and unlock the clutch disk 40 from the flywheel so that the flywheel freely spins with the engine crankshaft. At this point, the clutch system 10 is disengaged, the vehicle will idle without stalling and the vehicle operator can change gears in the vehicle transmission.

Through research and experimentation, the present inventors have found that if the clutch release bearing 36 is not installed properly on the clutch fork 30, the clutch system 10 will not release correctly. Such improper installation can lead to premature failure of the release bearing 36 and damage to other parts of the vehicle drive system.

Figure 2:
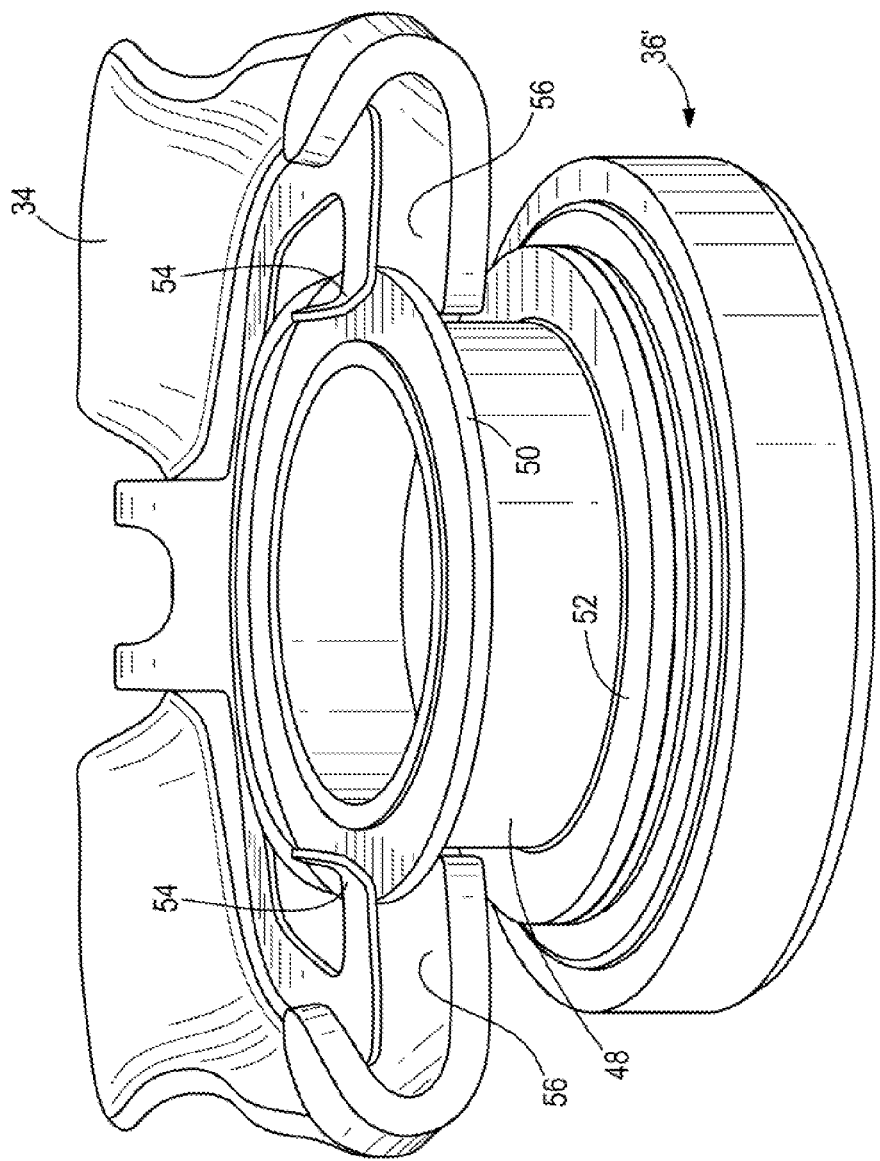
FIG. 2 is a perspective view of a prior art release bearing improperly installed on a clutch fork of the clutch system.

One example of improper installation of a prior art release bearing 36' is illustrated in FIG. 2. Here, the release bearing 36' includes a generally circular collar 48 provided with spaced apart radially extending flat outer and inner flanges 50, 52, respectively having a circular shape. The outer bifurcated end 34 of the clutch fork 30 is commonly formed with a pair of spaced apart spring clips 54 and a pair of rigid fork clips 56. The prior art release bearing 36' permits the outer flange 50 to be loosely and improperly positioned in a gap between the spring clips 54 and the fork clips 56 of the clutch fork 30 which will not allow the clutch system 10 to release correctly. Although not shown, improper installation can also occur when one of the spring clips 54 extends above the outer flange 50 and the other of the spring clips 54 extends beneath the outer flange 50. With care, the spring clips 54 and the fork clips 56 of the clutch fork 30 can be properly installed in frictional engagement around the collar 48 between the outer flange 50 and the inner flange 52 of the prior art release bearing 36'.

In accordance with the present disclosure, the release bearing 36 is constructed to provide error free installation with the spring clips 54 and the fork clips 56 on the clutch fork 30.

Figure 3:
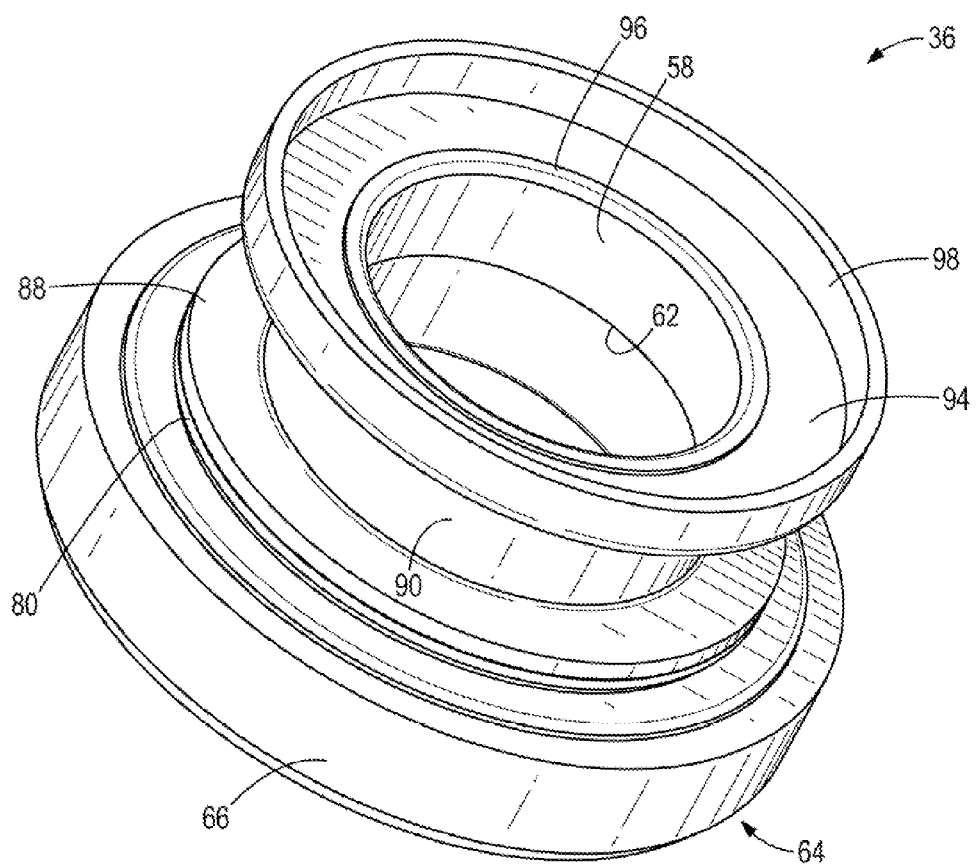
FIG. 3 is a perspective of the clutch release bearing shown in FIG. 1.

Referring now to FIGS. 3 and 4, the release bearing 36 of the present disclosure includes a tubular bearing carrier 58 which is mounted for axial sliding movement on a stationary guide member 60 which is affixed to and projects forwardly of the vehicle transmission. An inner surface of the bearing carrier 58 is formed with a groove 62 for retaining a lubricant, such as grease, facilitating reciprocating movement of the bearing carrier 58 along the guide member 60.

A bearing assembly 64 is supported in surrounding relationship to the bearing carrier 58, and includes an outer rotatable race member 66 which is formed at a forward or left hand end of FIG. 4 with a radially inwardly extending annular surface 68. The annular surface 68 defines an engaging face for co-acting with the ends of springs or release fingers 46 of the pressure plate 42 during release actuation of the clutch system 10. The bearing assembly 64 further includes a plurality of anti-friction elements, such as balls 70, interposed between the outer rotatable race member 66 and an inner stationary race member 72, and held in place by retainers 74. The inner race member 72 has a radially inwardly extending portion 76 provided with a reinforcement member 77 which is radially spaced from the outer surface of the bearing carrier 58. The inner race member 72 also has an axially rearwardly extending portion 78 secured to an annular stabilization washer 80 extending radially outwardly from and fixed to the bearing carrier 58. A forward seal 82 is provided between the outer race member 66, the reinforcement member 77 and the bearing carrier 58, and is held in position by a bent circular edge 84 on the forward end of the bearing carrier 58. A rearward seal 86 extends between rearward portions of the outer race member 66 and the inner race member 72. The seals 82 and 86 serve to retain a suitable lubricant, such as grease, within the bearing assembly 64, and further prevent contaminants from entering the bearing assembly 64.

An outer portion of the washer 80 is attached to a radially extending circular inner flange 88 formed on an axially rearwardly extending collar 90. The collar 90 is generally cylindrical in configuration except for a raised lobe portion 92 as seen in FIGS. 4 and 7. A rearward portion of the collar 90 is secured to a circular outer flange 94 spaced from the inner flange 88 that extends radially outwardly from the bearing carrier 58, and has a lower end engaged by a bent circular edge 96 at the rearward end of the bearing carrier 58. The outer flange 94 is formed at an outer edge thereof with a bent circular lip 98 which extends in an axially rearward direction beyond a rearward edge of the bearing carrier 58.

With the intent of preventing premature failure of the release bearing 36 and damage to the clutch system 10, the circular lip 98 of the outer flange 94 is configured with an outer diameter D and a height H measured in an axial direction parallel to a longitudinal axis A of the bearing carrier 58 which will enable an error proof installation of the spring clips 54 and the fork clips 56 of the clutch fork 30 around the collar 90 and between the inner flange 88 and the outer flange 94.

More particularly, the outer diameter D of the circular lip 98 is greater than an outer diameter of the inner flange 88. In an exemplary embodiment, the outer diameter D is sized at 57 millimeters. The height H of the circular lip 98 is greater than the thickness T of the outer flange 94 as well as the thickness T1 of the inner flange 88. In the exemplary embodiment the height H is sized at 6 millimeters.

In contrast, an outer diameter of the outer flange 50 of prior art release bearing 36' shown in FIG. 2 is less than an outer diameter of the inner flange 52. A thickness or height of the outer flange 50 is less than the thickness of the inner flange 52. The present inventors have found that the combination of the outer diameter and the thickness of the outer flange 50 of prior art release bearing 36' makes it possible to improperly install the outer flange 50 in the gap between the spring clips 54 and the fork clips 56 of the clutch fork 30.

Figure 5:
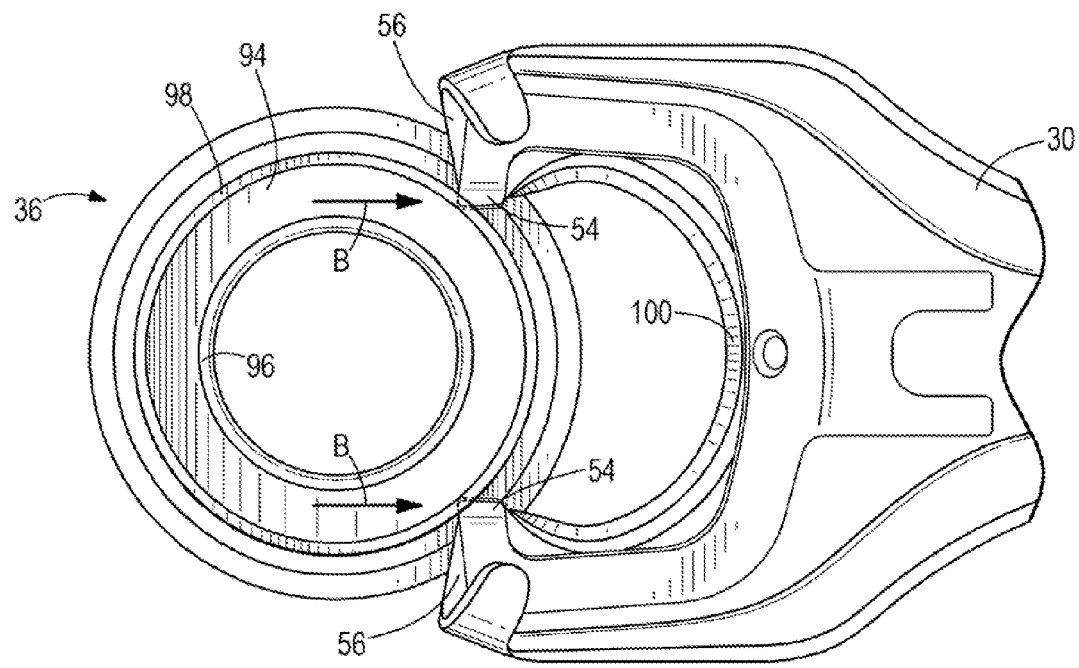
FIGS. 5 and 6 are views of a progressive proper installation of the clutch release bearing on the clutch fork.
Figure 6:
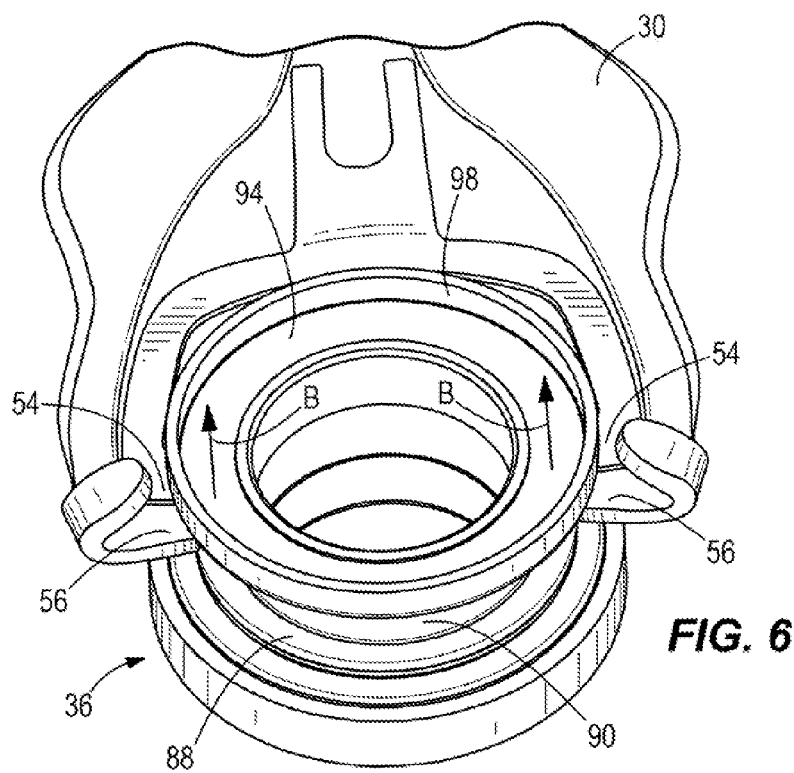
Figure 8:
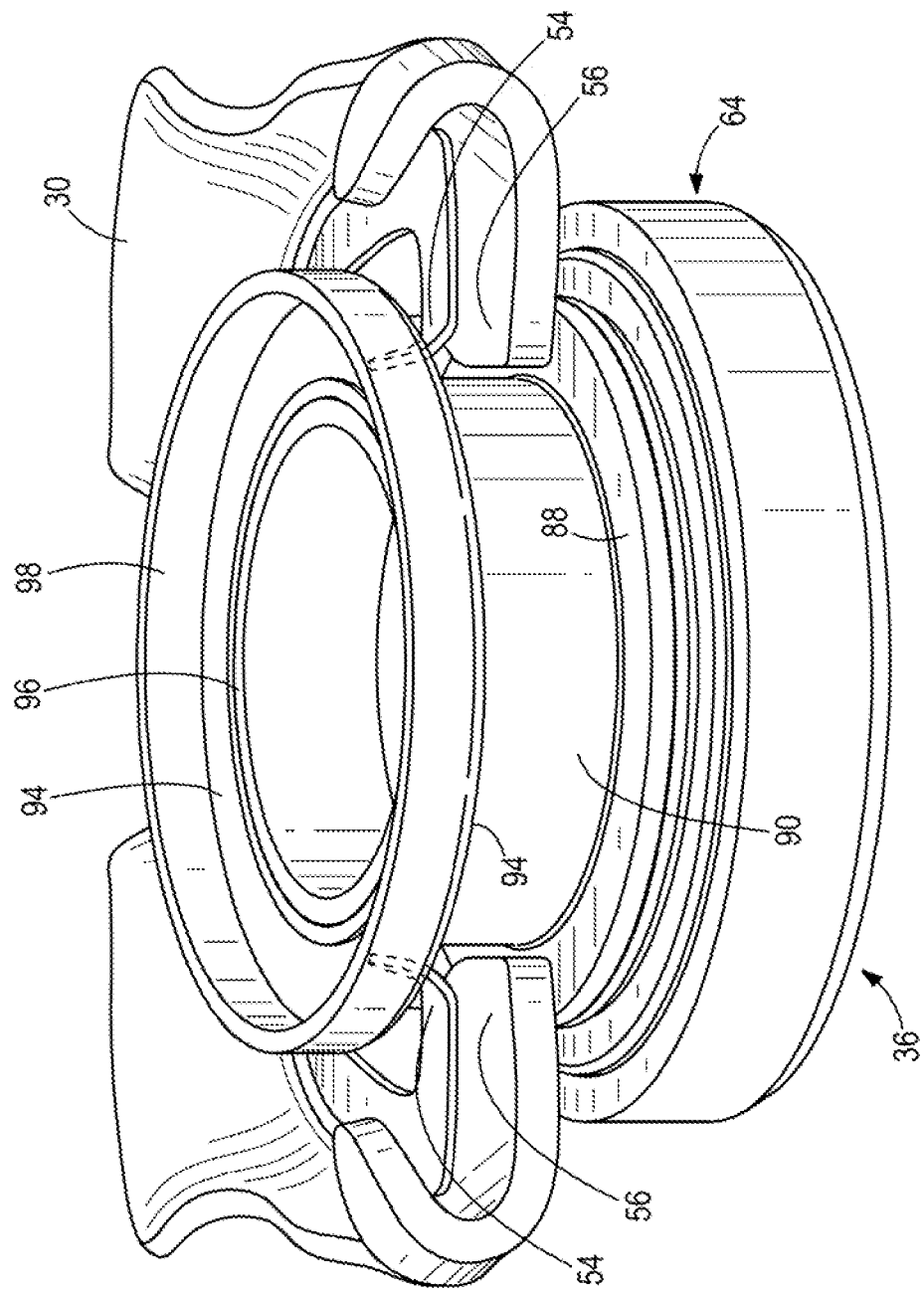
FIG. 8 is a perspective view of the finished proper installation of the clutch release bearing on the clutch fork.

FIGS. 5-8 illustrate a method of error free installation of the release bearing 36 on the clutch fork 30. In FIG. 5, the outer flange 94 and the bent circular lip 98 are oriented upwardly and the release bearing 36 is placed adjacent the open pocket 100 of the clutch fork 30. Because of the outer diameter D and the height H of the circular lip 98, the spring clips 54 and the fork clips are aligned exclusively between the inner flange 88 and the outer flange 94. The particular construction of the circular lip 98 on outer flange 94 makes it difficult or impossible to place the lip 98 between the spring clips 54 and the fork clips 56. As seen in FIGS. 5 and 6, the release bearing 36 is urged in the direction of arrows B into the pocket 100 of the clutch fork 30 against the biasing force of the spring clips 54 such that the spring clips 54 frictionally engage a bottom surface of the outer flange 94 beneath the circular lip 98, and the fork clips 56 frictionally engage a top surface of the inner flange 88. FIGS. 7 and 8 depict a finished proper installation and frictional retention of the release bearing 36 within the clutch fork 30. As is known from the prior art, the lobe portion 92 is used to limit any rotational motion of the collar 90 relative to the spring clips 54 and the fork clips 56 during clutch use. At this point, it should be appreciated that the circular lip 98 is configured to ensure reception and retention of the spring clips 54 and the fork clips 56 only between the inner flange 88 and the outer flange 94. The properly assembled release bearing 36 and clutch fork 30 are then ready for installation within the clutch system 10.

What is claimed is:

1. A clutch release bearing adapted to be installed on holding structure of a clutch fork in a clutch system, the clutch release bearing comprising:
   a bearing carrier adapted to be supported on a guide member of the clutch system;
   a bearing assembly supported in surrounding relationship on the bearing carrier;
   an inner flange extending radially outwardly from the bearing carrier; and
   an outer flange spaced from the inner flange and secured to and extending radially outwardly of the bearing carrier, wherein the outer flange includes an outer edge bent axially rearwardly beyond the rearward edge of the bearing carrier to form a circular lip defining an installation safeguard configured and adapted to ensure reception and retention of the holding structure of the clutch fork only between the inner flange and the outer flange.

2. The clutch release bearing of claim 1, wherein the inner flange and the outer flange have a circular configuration.

3. The clutch release bearing of claim 2, wherein an outer diameter of the circular lip is greater than an outer diameter of the inner flange.

4. The clutch release bearing of claim 1, wherein an outer diameter of the circular lip is 57 millimeters.

5. The clutch release bearing of claim 1, wherein a height of the circular lip is 6 millimeters.

6. The clutch release bearing of claim 1, wherein the bearing assembly includes a plurality of balls interposed between a rotatable outer race and a stationary inner race fixed to a stabilization washer extending radially from the bearing carrier.

7. The clutch release bearing of claim 6, wherein the inner flange is fixed to the stabilization washer.

8. The clutch release bearing of claim 1, wherein a collar is attached to the bearing carrier and extends between the inner flange and the outer flange.

9. A clutch release bearing installed on holding structure of a clutch fork in a clutch system, the clutch release bearing comprising:
- a bearing carrier;
- a bearing assembly supported in surrounding relationship on the bearing carrier;
- an inner flange extending radially outwardly from the bearing carrier; and
- an outer flange spaced from the inner flange and secured to and extending radially outwardly of the bearing carrier,
- wherein the outer flange includes an outer edge bent axially rearwardly beyond the rearward edge of the bearing carrier to form a circular lip defining an installation safeguard configured to ensure reception and retention of the holding structure of the clutch fork only between the inner flange and the outer flange.

10. The clutch release bearing of claim 9, wherein the inner flange and the outer flange have a circular configuration.

11. The clutch release bearing of claim 10, wherein an outer diameter of the circular lip is greater than an outer diameter of the inner flange.

12. The clutch release bearing of claim 9, wherein an outer diameter of the circular lip is 57 millimeters.

13. The clutch release bearing of claim 9, wherein a height of the circular lip is 6 millimeters.

14. The clutch release bearing of claim 9, wherein the bearing assembly includes a plurality of balls interposed between a rotatable outer race and a stationary inner race fixed to a stabilization washer extending radially from the bearing carrier.

15. The clutch release bearing of claim 14, wherein the inner flange is fixed to the stabilization washer.

16. The clutch release bearing of claim 9, wherein the holding structure includes a set of spring clips frictionally engaged with the outer flange beneath the circular lip.

17. The clutch release bearing of claim 16, wherein the holding structure further includes a set of fork clips frictionally engaged with the inner flange beneath the circular lip.

18. The clutch release bearing of claim 9, wherein a collar is attached to the bearing carrier and extends between the inner flange and the outer flange.

19. A method of providing error proof installation of a clutch release bearing relative to holding structure of a clutch fork and a clutch system, the method comprising the steps of:
- a) providing the clutch release bearing in the form of a bearing assembly supported in surrounding relationship to a bearing carrier, an inner flange extending radially outwardly from the bearing carrier, and an outer flange spaced from the inner flange and secured to and extending radially outwardly from the bearing carrier, the outer flange including an outer edge bent axially rearwardly beyond a rearward edge of the bearing carrier to form a circular lip;
- b) aligning the clutch release bearing with a pocket and the holding structure of the clutch fork; and
- c) urging the clutch release bearing into the pocket of the clutch fork, the circular lip being sized and shaped to permit reception and retention of the holding structure only between the outer flange and the inner flange.

20. The method of claim 19, wherein the holding structure of the clutch fork includes a set of spring clips and a set of fork clips spaced from the spring clips.

21. The method of claim 20, wherein retention of the holding structure includes frictional engagement of the spring clips with the outer flange beneath the circular lip, and frictional engagement of the fork clips with the inner flange beneath the circular lip.

22. The method of claim 19, wherein a collar is attached to the bearing carrier and extends between the inner flange and the outer flange.

* * * * *